COMPUTER SYSTEM

Filed March 7, 1963 3 Sheets-Sheet 1

INVENTORS
MURRAY ROSENBLATT &
DAVID E. WILLIAMS
BY Carl V. Olson
ATTORNEY

INVENTORS
MURRAY ROSENBLATT &
DAVID E. WILLIAMS
BY Carl V. Olson
ATTORNEY

COMPUTER SYSTEM

Filed March 7, 1963

| INPUTS | | OUTPUT |
|---|---|---|
| L | L | H |
| L | H | L |
| H | L | L |
| H | H | L |

| INPUTS | | OUTPUT |
|---|---|---|
| H | H | H |
| H | L | L |
| L | H | L |
| L | L | L |

| INPUT | OUTPUT |
|---|---|
| H | L |
| L | H |

| INPUT | "1" OUTPUT | "0" OUTPUT |
|---|---|---|
| SET H | L | H |
| RESET H | H | L |

| INPUTS | | OUTPUT |
|---|---|---|
| H | H | H |
| H | L | H |
| L | H | H |
| L | L | L |

INVENTORS
MURRAY ROSENBLATT &
DAVID E. WILLIAMS
BY Carl V. Olson
ATTORNEY

United States Patent Office 3,287,705
Patented Nov. 22, 1966

3,287,705
COMPUTER SYSTEM

Murray Rosenblatt, Haddonfield, and David E. Williams, Stratford, N.J., assignors to Radio Corporation of America, a corporation of Delaware Filed Mar. 7, 1963, Ser. No. 263,669
6 Claims. (Cl. 340—172.5)

This invention relates to computer systems, and has for its object the provision of a system wherein two similar independent computers are connected together for intercommunication in a manner such that instruction and data words are automatically transferred between the data buses of the two computers when called for in the performance of programs in the computers.

According to an illustrative example, the invention is useful in conjunction with two similar independent computers each including a memory, a data bus and a central processor for controlling the flow of words therein in the performance of programs, the central data processor in each computer including a program interrupt means for stopping the performance of a program at an interruptable point and entering into the performance of a computer-to-computer transfer program. An intercommunication system includes a computer-to-computer transfer bus, first cross connection means connecting the central data processor of each computer to the program interrupt means in the central data processor of the other computer for sending a communication request signal to cause the request-receiving computer to enter into a computer-to-computer transfer program, send gates associated with each computer for coupling signals on its data bus to the transfer bus, receive gates associated with each computer for coupling signals to its data bus from the transfer bus, a send and receive means in each computer operative in response to the execution of the computer-to-computer transfer program of the respective computer selectively to enable said send and receive gates associated therewith, whereby a word can be transferred from the data bus of one computer through the transfer bus to the data bus of the other computer, and second cross connection means cross connecting the send and receive means associated with the two computers in an interlocking fashion to prevent the sending by a sending computer of a subsequent word until after a preceding word has been accepted by the receiving computer.

Figure 1:
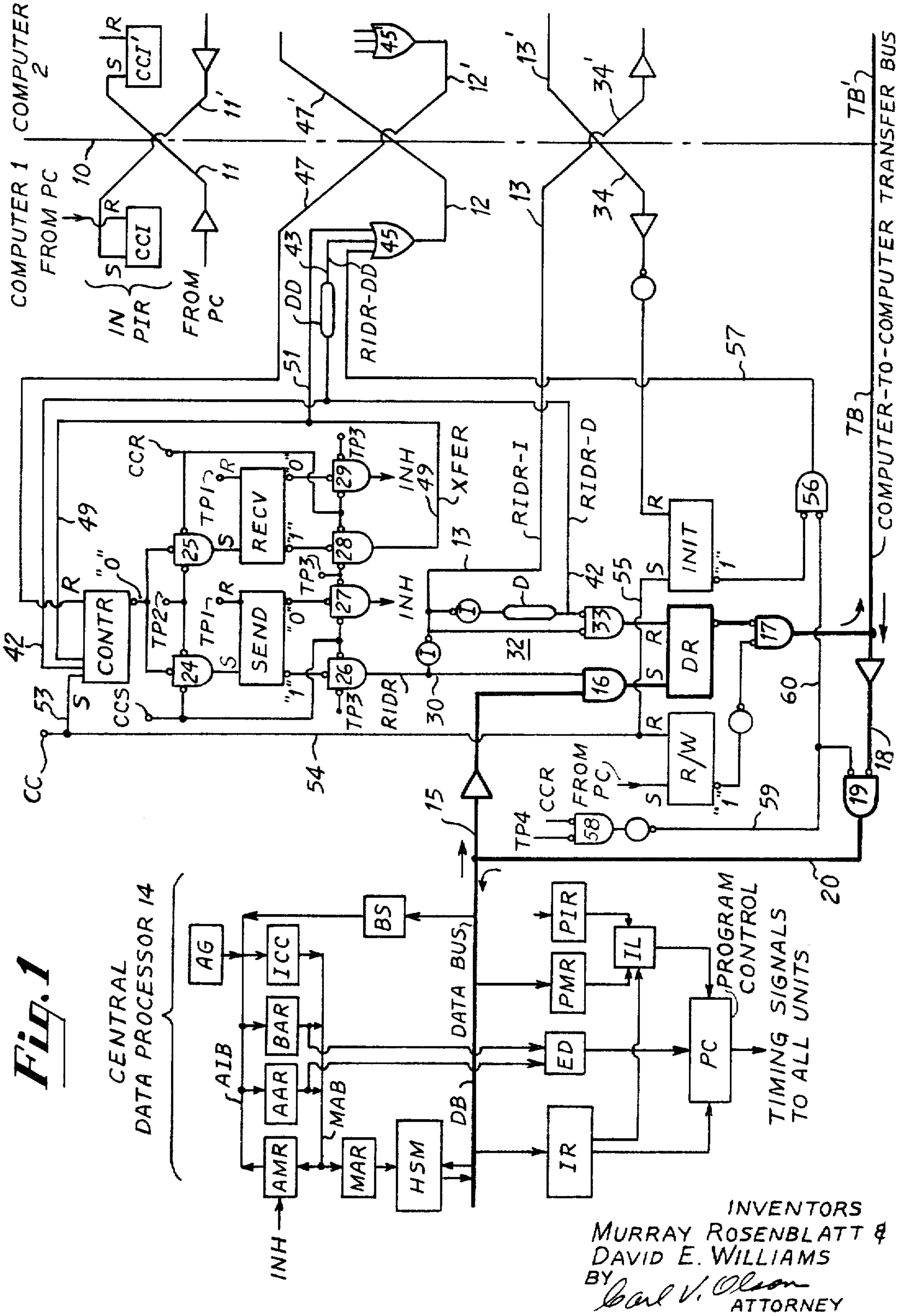
FIG. 1 is a diagram showing the central data processor of one computer, and associated circuits which may be connected to similar circuits associated with the similar central data processor of a second computer for the purpose of effecting automatic intercommunication between the two computers.

Reference is now made in greater detail to the system of the invention as shown in FIG. 1. The circuit elements are illustrated by symbols representative of conventional known circuits which operate in manners defined by the associated truth tables of FIG. 4. The circuit elements shown to the left of the line 10 are included in a computer 1, and the circuit elements shown to the right of line 10 are a few of the similar circuit elements in a computer 2. It is not necessary to illustrate all of computer 2 is FIG. 1 because computer 2 is the same as computer 1. Throughout the description, legends identifying elements and connections in computer 1 are used, with a prime added, to identify corresponding elements and connections in computer 2. The only electrical connections between the two computers are the ones designated 11, 11', 12, 12', 13, 13' and TB, TB', the legends TB, TB' being used to identify the transfer bus over which instruction and data words are passed between computers 1 and 2.

The left-most portion of FIG. 1 shows a simplified block diagram of the central data processing portion 14 of the computers. A high-speed memory HSM is connected to supply instruction and data words to a data bus DB, and to receive words from the data bus DB. Desired word locations in memory HSM are selected by a memory address register MAR to which addresses are supplied at various times from an address modification register AMR, an A address register AAR, a B address register BAR, and an instruction control counter ICC, over a memory address bus MAB. Memory addresses are supplied to the registers over an address input bus AIB from an address generator AG or from the data bus DB via a bus separator BS. In the execution of a computer-to-computer instruction, an address is transferred from the A address register AAR to the memory address register MAR and to the address modifying register AMR. The address modifying register adds one (1) to the address and the incremented address is placed back in the A address register AAR. Thus, successive memory accesses are made to successive memory locations. However, the incrementing of the address placed back in the A address register AAR may be inhibited by a signal from circuits to be described.

The B address register BAR may be loaded with the address of a memory location at the end of a block of memory locations from which, or to which, information is to be transferred. The outputs of the registers AAR and BAR are connected to an equality detector ED. The equality detector ED supplies a signal to the program control unit PC when equality is detected indicating that all memory locations of the block have been addressed.

The normal program being performed by the computer may be interrupted following the application of a signal to a program indicator register PIR. The data bus DB is connected to a program mask register PMR and is connected to an instruction register IR. Output of the three named registers are supplied to an interruption logic circuit IL having an output applied to the program control unit PC. The program control unit PC supplies timing and control signals over paths (not shown) to circuits throughout the computer. The program control unit PC operates at the time of each clock pulse to decode the information supplied to it and to generate appropriate control pulses and signal levels which are directed to circuits throughout the computer to cause the performance of operations called for by the program stored in the high speed memory HSM.

The program being executed by the central data processor 14 may be interrupted for the purpose of executing another program. The points in a program being performed where interruption is permitted are detremined by the program itself. This is done by coding certain instructions of the program to indicate that they are interruptable for the execution of certain other programs. Both of the registers PMR and PIR are used in determining whether the program being performed should be interrupted. The program indicator register PIR includes flip-flops each of which is set by a signal requesting that the program being performed be interrupted for the performnace of a particular different program. The program mask register PMR is loaded by the program being performed with the conditions of the program indicator register PIR under which interruption of the program being performed will be permitted. At the end of each interruptable instruction, the contents of the registers PIR and PMR are compared in the interrupt logic unit IL. If matching flip-flops in the registers PMR and PIR are found to be set, the interrupt logic unit IL and the program control unit PC cause the initial address of the particular new interrupting program to be placed in the instruction control counter ICC, which then operates through the memory address register MAR to address successive locations in the memory HSM where instructions of the new program are located. The program previously being executed is thus interrupted and the interrupting program is executed.

One of the flip-flops in the program indicator register PIR is the flip-flop CCI shown in the upper right hand corner of FIG. 1. The flip-flop CCI in computer 1 is set by a signal over line 11' when computer 2 desires to communicate with computer 1. Then, when a point is reached in the program being performed by computer 1 at which a computer-to-computer interrupt is permitted, the central data processor 14 of computer 1 interrupts the program it is performing, enters into the performance of its computer-to-computer transfer program and resets the flip-flop CCI. Computer 1 can similarly interrupt computer 2. The conductors 11 and 11' are cross connections connecting the central data processor of each computer to the program interrupt means in the central data processor of the other computer for sending a communication request signal to cause the request-receiving computer to enter into a computer-to-computer transfer program.

Information words (instruction and data words) on the data bus DB of computer 1 can be conveyed over the computer-to-computer transfer bus TB, TB' to computer 2 over a path including bus 15, send "and" gates 16, data register DR and send "nor" gates 17. The reverse flow of instruction and data words follows bus 18, receive "nor" gates 19 and bus 20. The recited buses and elements shown in heavy lines in FIG. 1 represent a plurality of conductors and elements equal in number to the number of bits in words which the computer is designed to handle.

The circuits, which may be termed send and receive means, for controlling the transfer of words between the computers 1 and 2 include control flip-flop CONTR having set inputs S and a reset input R. A "0" output of the flip-flop is coupled to inputs of "nor" gates 24 and 25, each of which have an input for a timing pulse TP2. The output of gate 24 is connected to the set input of a flip-flop SEND, and the output of gate 25 is connected to the set input of a flip-flop RECV. The reset inputs of both flip-flops are supplied with a timing pulse TP1. The "1" and "0" outputs of the flip-flop SEND are connected to inputs of "nor" gates 26 and 27, respectively. The "1" and "0" outputs of the flip-flop RECV are connected to inputs of "nor" gates 28 and 29, respectively. The gates 24, 26 and 27 are each supplied with computer-to-computer send signals CCS over a path not shown from the program control unit PC. The gates 25, 28 and 29 are each supplied with a computer-to-computer receive signal CCR over a path not shown from the program control unit PC. The gates 26, 27, 28 and 29 are each supplied with a timing pulse signal TP3 from the program control unit PC.

The output of gate 26 provides a read-in data register signal RIDR on lead 30 which enables the send gate 16 so that data on the bus 15 is read into the data register DR. The signal RIDR is also coupled through a network 32 including inverters I and a delay line D to inputs of a "nor" gate 33 having an output connected to the reset terminal R of the data register DR. The lead 30, the send gate 16, the network 32 and the reset gate 33 are operative to insure the proper transfer of data from the data bus 15 to the data register DR without the necessity for providing a separate reset pulse for the data register from a separate timing pulse source. This arrangement per se, is not the invention of the applicant, an, therefore, it will not be described in detail.

The output RIDR of the gate 26 is also applied, after inversion, as a signal RIDR–I over the line 13 to computer 2 where the signal is conveyed through a line 34', a line driver and an inverter to the reset input R of an initiation flip-flop INIT'. The line 34' and the flip-flop INIT' of computer 2 are not shown in FIG. 1, but they are the same as the line 34 and the flip-flop INIT in computer 1. The signal RIDR is delayed by delay line D to provide a signal pulse designated RIDR–D which is applied over lead 42 to a set input of control flip-flop CONTR. A pulse additionally delayed by delay line DD is designated RIDR–DD and is conveyed over lead 43 to an input of an "or" gate 45. The output of "or" gate 45 is conveyed over lead 12 and lead 47' to the reset input R of the control flip-flop CONTR' in computer 2, the lead 47', and the control flip-flop CONTR' being the same as the lead 47 and the flip-flop CONTR in computer 1.

The output of the "nor" gate 28 constitutes a data transfer indicating signal XFER which is conveyed over lead 49 to a set input S of the control flip-flop CONTR, and is conveyed over the lead 51 to an input of the "or" gate 45.

A read/write flip-flop R/W has a set input S connected over a lead (not shown) to the program control unit PC, and has a "1" output connected through an inverter to an input of the send "nor" gate 17. A terminal CC is connected by a lead (not shown) to the program control unit PC, and is connected by a lead 53 to the set input of control flip-flop CONTR, by a lead 54 to the reset input R of the read/write flip-flop R/W, and by a lead 55 to the set input S of the initiation flip-flop INIT. The "1" output of the initiation flip-flop INIT is connected to an input of a "nor" gate 56.

A "nor" gate 58 is supplied from the program control unit PC with a timing pulse signal TP4 and the previously-mentioned signal CCR, over leads not shown. The output of the "nor" gate 58 is connected over lead 59 to an input of the receive "nor" gate 19, and over lead 60 to an input of "nor" gate 56. The output of "nor" gate 56 is connected over lead 57 to an input of "or" gate 45. The output conductor 12 of "or" gate 45, and the corresponding output conductor 12' of "or" gate 45', constitute cross connections between the send and receive means of the two computers to prevent the sending by a sending computer of a subsequent word until after a preceding word has been accepted by the receiving computer.

Figure 2:
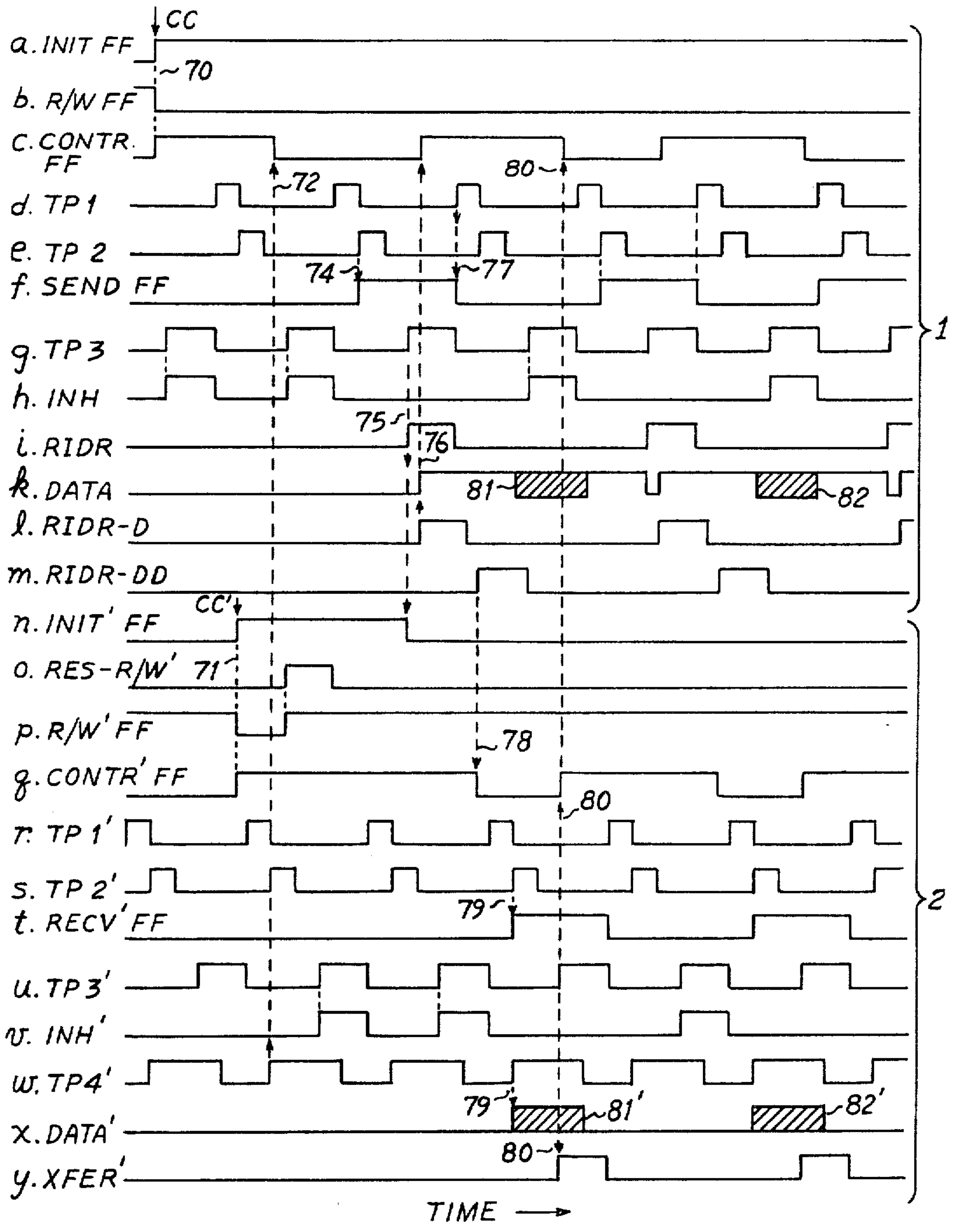
FIG. 2 is a time chart of signals which will be referred to in describing the operation of the system of FIG. 1.
Figure 3:
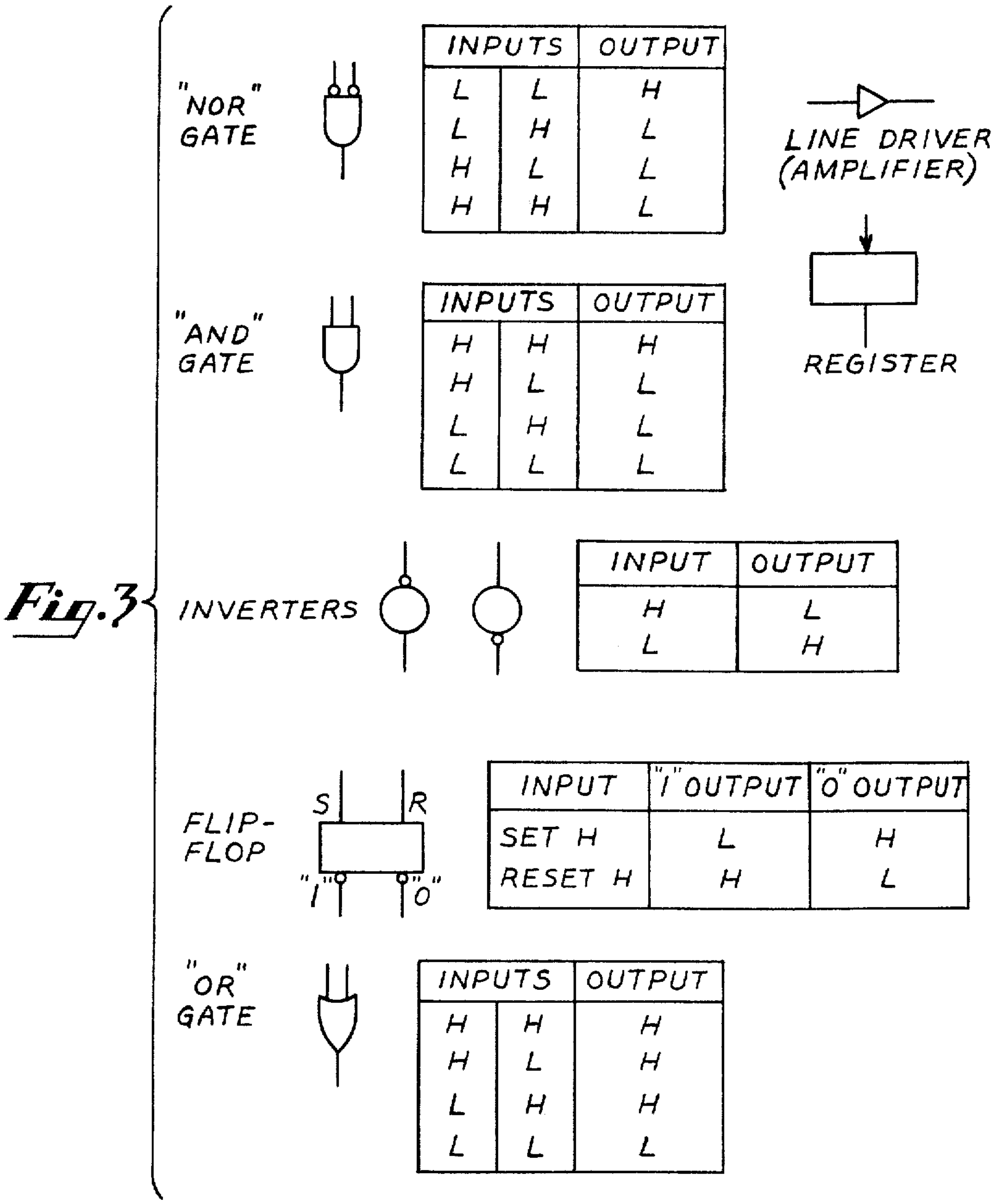
FIG. 3 is a key to the symbols used for representing logic circuits in the system of FIG. 1.

The operation of the system of FIG. 1 will now be described with references to the signal time charts of FIG. 2. When computer 1 reaches a point in its program at which communication with computer 2 is required, the program control unit PC of computer 1 sends a pulse over line 11 which sets the computer-to-computer interrupt flip-flop CCI' in the program indicator register PIR' of computer 2. When computer 2 reaches a point (as determined by the contents of its program mask register PMR') in the program it is executing at which its program can be interrupted for a computer-to-computer transfer, its interruption logic unit IL' detects this fact and signals the program control unit PC' to interrupt the program being performed, to enter into the computer-to-computer transfer program and to reset the flip-flop CCI'. Computer 1 was and is executing the initial part of its computer-to-computer transfer program and computer 2 is now executing the initial part of its computer-to-computer transfer program. Computer 1, having requested communication, must transfer instruction words to computer 2 which will later control computer 2 for the purpose of transferring information words (instruction or data words) either from computer 1 to computer 2, or from computer 2 to computer 1. The transfer of the first two instruction words from computer 1 to computer 2 under the control of the programs in the two computers will now be described.

The program control unit PC in computer 1 supplies a computer-to-computer signal to the terminal CC, at time 70 of FIG. 2, which is applied to flip-flops INIT, R/W and CONTR, as follows. The signal CC is applied over lines 54 and 55 to set the initiation flip-flop INIT, as represented by FIG. 2*a*. The signal CC is additionally applied over line 54 to reset the read-write flip-flop R/W (FIG. 2*b*), which has an output enabling send gate 17, so that the words in the data register DR can pass to the transfer bus TB. The signal CC is also applied over line 53 to set the control flip-flop CONTR (FIG. 2*c*) which, when set, has an output that does *not* tend to enable "nor" gates 24 and 25.

The same described action takes place in computer 2 when a signal CC′ is applied, at time 71, to flip-flops INIT′ (FIG. 2*n*), R/W′ (FIG. 2*p*) and CONTR′ (FIG. 2*q*).

The program control unit PC is computer 1 supplies a computer-to-computer *send* signal level to the terminal CCS, and the program control unit PC′ in computer 2 supplies a computer-to-computer *receive* signal level to the terminal CCR′.

Computers 1 and 2 each may be so-called synchronous machines including timing pulse generators which operate independently of each other and which need not be brought into synchronism with each other during the transfer of instruction and data words between the computers. The timing pulses TP1, TP2 and TP3, of computer 1 are shown in FIGS. 2*d*, 2*e* and 2*g*, respectively, and the corresponding unsynchronized timing pulses TP1′, TP2′, TP3′ and TP4′ of computer 2 are shown in FIGS. 2*r*, 2*s*, 2*u* and 2*w*, respectively. The signals CC, CCS, CCR and the timing pulses TP1, TP2, TP3 and TP4 are generated by the program control unit PC as the result of its decoding of instructions of the computer-to-computer transfer program stored in the memory HSM of the computer.

The send flip-flop SEND is normally reset (as shown by FIG. 2*f*) as the result of having received a timing pulse TP1 on its reset terminal R. The "0" output of flip-flop SEND and the send signal CCS enable gate 27 so that timing pulses TP3 (FIG. 2*g*) normally pass through gate 27 as inhibit pulses INH (FIG. 2*h*). The inhibit pulses INH are applied over lines (not shown) to the data processor 14 where they are used to inhibit the interpretation and use of words that prematurely may arrive on the data bus DB. This is done by inhibiting the address modification register AMR, as has been described, so that words arriving prematurely on data bus DB and entered into the memory HSM are destructively written over when correct data words arrive.

Following the setting, at time 71, of the initiation flip-flop INIT′ in computer 2 (FIG. 2*n*) and the consequent enabling of the gate 56′, the next following timing pulse TP4′ (FIG. 2*w*) is passed by enabled gate 58′ through lead 59′, 60′, enabled gate 56′, lead 57′, "or" gate 45′, lead 12′, and then, in computer 1, through lead 47 to cause the resetting of control flip-flop CONTR (FIG. 2*c*) at time 72.

Now that control flip-flop CONTR in computer 1 is reset, its "0" output cooperates with the input CCS to the "nor" gate 24 to enable the gate 24 to pass the next following timing pulse TP2 (FIG. 2*e*) causing the send flip-flop SEND (FIG. 2*f*) to be set at time 74. When the flip-flop SEND is set, its "0" output blocks gate 27 preventing the generation of an inhibit pulse INH during TP3, and its "1" output enables gate 26 causing the generation of a read-in-data-register pulse RIDR (FIG. 2*i*) on lead 30 at time 75. The RIDR pulse enables gate 16 causing the reading in of an instruction word from the data bus DB to the data register DR. Since the send gate 17 is already enabled, the word also appears on the computer-to-computer transfer bus TB, TB′. The read-in system 15, 16, 30, 32, 33 of the data register DR results in the word being present in the data register DR and on the transfer bus TB, as represented by FIG. 2*k*, from the time 76.

The RIDR pulse is also applied over lead 13 to computer 2 where it passes along line 34′ to reset the initiation flip-flop INIT′ in computer 2 at time 75, as shown by FIG. 2*n*. The "1" output of flip-flop INIT′ blocks gate 56′ thus putting a stop to the sending of TP4 reset pulses to the already reset flip-flop CONTR over the path including gate 58′, lead 59′, 60′, gate 56′, lead 57′, "or" gate 45′, lead 12′ and lead 47.

A delayed RIDR pulse RIDR–D (FIG. 21) having a leading edge at time 76 is applied over lead 42 to set the flip-flop CONTR (FIG. 2c). As a consequence, the next following timing pulse TP1 resets the flip-flop SEND at time 77, and the next following timing pulse TP2 is unable to pass through gate 24 to set the flip-flop SEND.

An additionally delayed RIDR pulse RIDR–DD (FIG. 2*m*) is applied through line 43, "or" gate 45, line 12, and in computer 2, line 47′, to reset flip-flop CONTR′ (FIG. 2*q*) at time 78. This enables gate 25′ so that timing pulse TP2′ sets flip-flop RECV′ (FIG. 2*t*) at time 79. As a result, inhibit pulses INH′ (FIG. 2*v*) are no longer generated by gate 29′ at TP3′, and instead a transfer pulse XFER′ (FIG. 2y) is generated by gate 28′ at time 80.

During the preceding period, the enabling of receive gate 19′ by timing pulses TP4′ (FIG. 2*w*) from gate 58′ has been passing whatever word may have been on the computer-to-computer bus TB′ to the data bus DB′ and high speed memory HSM′ in computer 2. However, the inhibit pulses INH′ (FIG. 2*v*) have prevented in advancing of the memory address register MAR′ so that each word that may have been applied to the memory was destroyed (written over) by the next following word without any of the words being read and utilized by the computer 2. But now a word (FIG. 2*k*) intended for computer 2 has been applied to the transfer bus TB by computer 1 since time 76. When receive gate 19′ is enabled at time 79 (FIG. 2*x*), this word is transferred to the data bus DB′ and the high speed memory HSM of computer 2. The timing of the word transfer is represented by shaded areas at 81 and 81′ in FIG. 2. This word is interpreted and used by computer 2 because the interpretation and use of the word is not prevented by an inhibit pulse INH′.

The transfer pulse XFER′ (FIG. 2*y*) in computer 2 signifies, by its presence in place of an inhibit pulse INH′, that a word has been transferred from computer 1 to computer 2 and will be utilized by computer 2. The pulse XFER′ at time 80 is applied through line 49′ to set flip-flop CONTR′ (FIG. 2*q*) in computer 2, and is applied through line 51′, "or" gate 45′, line 12′ to computer 1 where it goes along line 47 and resets flip-flop CONTR (FIG. 2*c*). Thereafter, the sequence of operations repeat to effect the transfer, at 82, 82′ of the next following word.

The words thus initially transferred may be instruction words indicating to computer 2 whether data words are to be sent from computer 1 to computer 2, or vice versa, and indicating memory word locations, etc., to be used. If data words are to be transferred from computer 2 to computer 1, the operation is the same as has been described except that actions recited as occurring in computer 1 occur instead in computer 2, and vice versa.

What is claimed is:

1. In a system including two similar independent computers each including a memory, a data bus and a central processor for controlling the flow of words therein in the performance of programs, said central data processor in each computer including a program interrupt means for interrupting the performance of a program at an interruptable point and entering into the performance of a computer-to-computer transfer program, the combination of first cross connection means connecting the central data processor of each computer to the program interrupt means in the central data processor of the other computer for sending a communication request signal to cause the request-receiving computer to enter into a computer-to-computer transfer program, a computer-to-computer transfer bus, a send and receive means in ecah computer operative in response to the execution of the computer-to-computer transfer program of the respective computer to cause a word to be transferred from the data bus of one computer through the transfer bus to the data bus of the other computer, and second cross connection means cross connecting the send and receive means associated with the two computers in an interlocking fashion to prevent the sending by a sending computer of a subsequent word until after a preceding word has been accepted by the receiving computer.

2. The combination of, two similar independent computers, each including a memory, a data bus and a central processor for controlling the flow of words therein in the performance of programs, said central data processor in each computer including a program interrupt means for interrupting the performance of a program at an interruptable point and entering into the performance of a computer-to-computer transfer program, first cross connection means connecting the central data processor of each computer to the program interrupt means in the central data processor of the other computer for sending a communication request signal to cause the request-receiving computer to enter into a computer-to-computer transfer program, a computer-to-computer transfer bus, a send and receive means in each computer operative in response to the execution of the computer-to-computer transfer program of the respective computer to cause a word to be transferred from the data bus of one computer through the transfer bus to the data bus of the other computer, and second cross connection means cross connecting the send and receive means associated with the two computers in an interlocking fashion to prevent the sending by a sending computer of a subsequent word until after the preceding word has been accepted by the receiving computer.

3. In a system including two similar independent computers each including a memory, a data bus and a central processor for controlling the flow of words therein in the performance of programs, said central data processor in each computer including a program interrupt means for interrupting the performance of a program at an interruptable point and entering into the performance of a computer-to-computer transfer program, the combination of first cross connection means connecting the central data processor of each computer to the program interrupt means in the central data processor of the other computer for sending a communication request signal to cause the request-receiving computer to enter into a computer-to-computer transfer program, a computer-to-computer transfer bus, send gates associated with each computer for coupling signals on its data bus to said transfer bus, receive gates associated with each computer for coupling signals to its data bus from said transfer bus, a send and receive control means in each computer operative in response to the execution of the computer-to-computer transfer program of the respective computer selectively to enable said send and receive gates associated therewith, whereby a word can be transferred from the data bus of one computer through the transfer bus to the data bus of the other computer, and second cross connection means cross connecting the send and receive means associated with the two computers in an interlocking fashion to prevent the sending by a sending computer of a subsequent word until after a preceding word has been accepted by the receiving computer.

4. In a system including two similar independent computers each including a memory, a data bus, and a central processor for controlling the flow of words therein in the performance of programs, said central data processor in each computer including an address modifying register and including a program interrupt means for interrupting the performance of a program at an interruptable point and entering into the performance of a computer-to-computer transfer program, the combination of cross connection means connecting the central data processor of each computer to the program interrupt means in the central data processor of the other computer for sending a communication request signal to cause the request-receiving computer to enter into a computer-to-computer transfer program, a computer-to-computer transfer bus, send gates associated with each computer for coupling signals on its data bus to said transfer bus, receive gates associated with each computer for coupling signals to its data bus from said transfer bus, and send and receive control means associated with each computer and operative periodically to enable said send and receive gates and operative by interlocking cross connections therebetween to selectively inhibit said address modifying registers.

5. In a system including two similar independent computers each including a memory, a data bus, and a central processor for controlling the flow of words therein in the performance of programs, said central data processor in each computer including an address modifying register and a program interrupt means for interrupting the performance of a program at an interruptable point and entering into the performance of a computer-to-computer transfer program, the combination of cross connection means connecting the central data processor of each computer to the program interrupt means in the central data processor of the other computer for sending a communication request signal to cause the request-receiving computer to enter into a computer-to-computer transfer program, a computer-to-computer transfer bus, send gates associated with each computer for coupling signals on its data bus to said transfer bus, receive gates associated with each computer for coupling signals to its data bus from said transfer bus, send and receive control means each associated with a respective computer and operative under program control periodically to enable the associated send and receive gates and selectively to inhibit the associated address modifying register, and interlocking cross connection between the send and receive control means associated with each computer to prevent the sending by a sending computer of a subsequent word until after a preceding word has been accepted by the receiving computer.

6. In a system including two similar independent computers each including a memory, a data bus, and a central processor for controlling the flow of words therein in the performance of programs, said central data processor in each computer including an address modifying register and a program interrupt means for interrupting the performance of a program at an interruptable point and entering into the performance of a computer-to-computer transfer program, the combination of cross connection means connecting the central data processor of each computer to the program interrupt means in the central data processor of the other computer for sending a communication request signal to cause the request-receiving computer to enter into a computer-to-computer transfer program, a computer-to-computer transfer bus, send gates associated with each computer for coupling signals on its data bus to said transfer bus, receive gates associated with each computer for coupling signals to its data bus from said transfer bus, and send and receive control means associated with each computer including: a control flip-flop, means operative when the associated computer is executing a send program and said control flip-flop is set to direct timing pulses to inhibit the associated address modifying register and operative when said control flip-flop is reset to direct timing pulses to enable the associated send gates to direct delayed pulses to set the associated control flip-flop, and to direct additionally delayed pulses to reset the control flip-flop associated with the receiving computer; means operative when the associated computer is executing a receive program and said control flip-flop is set to direct timing pulses to inhibit the associated address modifying register in the receiving computer and operative when said control flip-flop is reset to direct a timing pulse to set the associated control flip-flop in the receiving computer and to reset the control flip-flop associated with the sending computer; and means also operative when the computer is executing a receive program to direct timing pulses to enable said receive gates.

References Cited by the Examiner

Publication: Automatic Control of December 1959, title "Duplexing Mobidic Computers," by Stanley Chao and Gerard Rocheleau.

ROBERT C. BAILEY, *Primary Examiner.*

G. D. SHAW, *Assistant Examiner.*